United States Patent [19]
Tsuchimoto et al.

[11] Patent Number: 5,994,701
[45] Date of Patent: Nov. 30, 1999

[54] INFRARED SENSOR DEVICE WITH TEMPERATURE CORRECTION FUNCTION

[75] Inventors: Kohzou Tsuchimoto; Akira Sema, both of Tokyo, Japan

[73] Assignee: Nippon Avonics Co., Ltd., Japan

[21] Appl. No.: 08/949,719

[22] Filed: Oct. 14, 1997

[30] Foreign Application Priority Data

Oct. 15, 1996 [JP] Japan ................................ 8-271930
Mar. 28, 1997 [JP] Japan ................................ 9-095060

[51] Int. Cl.$^6$ ................................................ G01J 5/06
[52] U.S. Cl. .................. 250/351; 250/252.1; 374/120; 374/121; 374/123; 374/124; 374/130
[58] Field of Search ........................ 250/351, 252.1; 374/120, 121, 123, 124, 130

[56] References Cited

U.S. PATENT DOCUMENTS

| | | | |
|---|---|---|---|
| 5,394,237 | 2/1995 | Chang et al. | 356/328 |
| 5,422,484 | 6/1995 | Brogi et al. | 250/339.15 |
| 5,604,346 | 2/1997 | Hamrelius et al. | 250/252.1 |
| 5,822,222 | 10/1998 | Kaplinsky et al. | 364/557 |

*Primary Examiner*—Constantine Hannaher
*Assistant Examiner*—Andrew Israel
*Attorney, Agent, or Firm*—Ostrolenk, Faber, Gerb & Soffen, LLP

[57] ABSTRACT

A shutter 3 which can be momentarily held open and immediately closed, is disposed adjacent to an aperture stop 4 in an optical system, and a temperature sensor 5 is provided for measuring the temperature of the shutter 3. The blades of the shutter 3 can be utilized as a reference heat source. With the shutter 3 disposed adjacent to the aperture stop 4, the optical equivalence in the case when a reference heat source is inserted and in the other case, is not spoiled. A shutter 202 which can be readily momentarily held open and immediately closed under control of a shutter controller 203, is disposed at the optical pupil position of a combination lens 201. When the shutter 202 is closed, thermal image data is stored in a shading memory 208. The shading data stored in the shading memory 8 is subtracted for each image element in a subtracter 207 from thermal image data, which is obtained by picking up external infrared image in the open state of the shutter, and the resultant difference data is outputted to a frame memory 209.

9 Claims, 4 Drawing Sheets

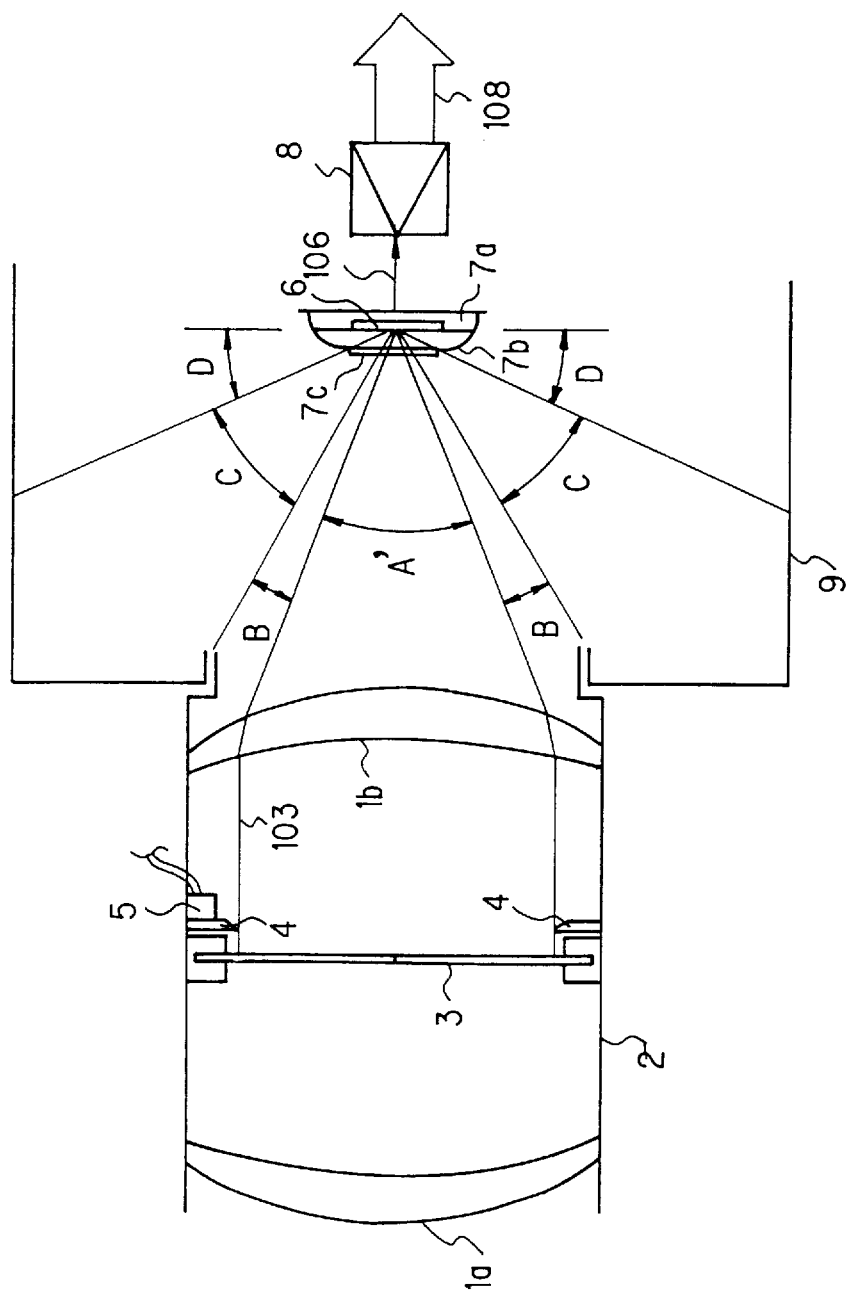
Fig. 2
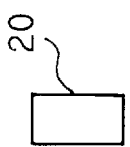

INFRARED SENSOR DEVICE WITH TEMPERATURE CORRECTION FUNCTION

BACKGROUND OF THE INVENTION

The present invention relates to an infrared sensor device with temperature correction function, and an infrared thermography for measuring the temperature of an object under measurement by detecting infrared rays emitted from the object with a two-dimensional infrared sensor. More particularly, the present invention concerns a method and an apparatus for removing adverse effects of various infrared rays attributable to the optical system on accurate temperature measurement and correcting a shading (temperature gradient) in infrared cameras using two-dimensional infrared sensors.

In the conventional infrared thermography, in order that only infrared rays emitted from the object under measurement are incident on the infrared sensor, a point sensor (i.e., a point-like infrared sensor) with a field-of-view aperture stop, which is also called cold shield and cooled to a low temperature, is used as means for detecting infrared rays. A two-dimensional thermal image is obtained by optically scanning infrared rays incident on the point sensor in the field of view with a mechanical scanner. With this mechanical scan system, it is possible to refer to a reference heat source by utilizing an ineffective period of scanning. The system corrects the output of the infrared sensor by comparing the infrared energy from the reference heat source and that from the object under measurement. By adopting this infrared sensor temperature correction method, it is possible to accurately measure the temperature of the object under measurement.

In this infrared sensor temperature correction method, the output of the infrared sensor is corrected such that the temperature represented by the output of the infrared sensor approaches the temperature of the object under measurement. Specifically, the output $Q_R$ of the infrared sensor, which is obtained when infrared rays emitted from the reference heat source at a known temperature is incident on the infrared sensor in lieu of the infrared rays emitted from the object under measurement, and the output $Q_W$ obtained when the infrared rays from the object under measurement are led through the optical system, are compared. Thereby the output component $Q_E$ of the infrared sensor which is attributable to infrared rays emitted from the other objects than the object under measurement is removed such as the optical system from the output $Q_W$ to generate an output a of the infrared sensor, which is attributable to sole infrared rays from the object under measurement.

The output a is processed in a signal processing unit to generate a thermal image signal to be displayed as a thermal image on a display. In this way, the thermal image which accurately represents the temperature of the object under measurement can be obtained.

However, in the case where a two-dimensional infrared sensor is used as infrared detecting means in the infrared thermophotograpy, the two-dimensional infrared sensor always receives infrared rays from the object under measurement. Although high accuracy can be ensured, it is impossible to refer to the reference heat source without image interruption. Besides, it is practically impossible to mount a cold shield on each of an enormous number of sensor elements. Therefore, infrared rays from objects other than the object under measurement (i.e., unnecessary infrared rays) are also received. For the above two reasons, the temperature measurement accuracy of the infrared thermographic system using the two-dimensional infrared sensor, is considerably low compared to the mechanical scan type system.

In order to improve the temperature measurement accuracy of the two-dimensional infrared sensor system, some infrared sensor temperature correction methods have been proposed. Among these methods, an estimation method, a table method and a heat source insertion method are well known in the art.

In the estimation method, a plurality of temperature sensors are disposed in an optical system to estimate by computation the unnecessary infrared energy, which is subject to variations in dependence on conditions, from the outputs of the temperature sensors. The infrared sensor temperature is corrected by subtracting the estimated unnecessary infrared energy from the infrared sensor output.

In the table method, the unnecessary infrared energy is actually measured by holding the camera part of the infrared thermographic system at various ambient temperatures, and a table showing the correspondence relation between the ambient temperature and the unnecessary infrared energy is produced for each system. When measuring the temperature of the object under measurement, the infrared sensor temperature is corrected by referring to the table in dependence on the ambient temperature.

The heat source insertion method is a temperature correction method similar to the method described before, which is adopted in the infrared thermography using a point sensor as infrared detecting means. In this system for the infrared sensor temperature correction a method is provided, which can insert a suitable reference heat source by motor driving or the like to a position right before the two-dimensional infrared sensor.

In the infrared thermography using the two-dimensional infrared sensor as infrared detecting means, some infrared sensor temperature correction methods have been proposed to improve low accuracy of temperature measurement, for example, disclosed in Japanese Laid-Open Patent Publication No. 63-163126.

In this temperature correction method, when making temperature correction, a shutter is inserted between a focusing lens and the two-dimensional infrared sensor, and also a thermistor is disposed near the shutter. For correction, the ambient temperature of the neighborhood of the shutter is measured by measuring the resistance of the thermistor, whereby the incident infrared dose from the shutter at a temperature substantially equal to the ambient temperature noted above can be known. The temperature of the object under measurement can be measured with reference to amplifier output at this time.

The above well-known methods of infrared sensor output correction, however, have respective drawbacks. In the estimation method, fluctuations with individual systems (such as sensitivity characteristics of the sensor, heat distribution in optical system and temperature measurement error of temperature sensor) cannot be absorbed. In addition, the optical system temperature distribution varies greatly with the rate of change even at the same ambient temperature. Furthermore, in the estimation method and the table method, a temperature measurement error is generated, which cannot be ignored.

Moreover, in the estimation method and the table method, it is impossible to refer to the reference heat source. Therefore, the infrared sensor is affected by electric temperature characteristics of the infrared sensor, secular changes of the optical system and so forth, and it is difficult to remove these adverse effects.

The table method has further problems that the system should be exposed to various ambient temperature conditions to obtain data, and that adjustment of the infrared thermographic system requires long time and temperature controlled vessel running expenditures.

The heat source insertion method permits referring to the reference heat source. However, the thermal image of the object under measurement cannot be obtained while the heat source is inserted. Besides, the operation of inserting the heat source with a mechanism based on a motor or the like takes long time, resulting in long thermal image interruption time. A further problem is that insertion of the heat source to be right before the infrared sensor, leads to spoiling of the equivalence of the optical system in the case when the heat source is inserted and in the other case. Therefore, even when the reference heat source is referred to, like the previous two methods, the infrared sensor output is affected by the optical system temperature distribution, and it is necessary to provide similar correction of the infrared sensor output by using a temperature sensor.

In the method disclosed in the Japanese Laid-Open Patent Publication No. 63-163126, since the shutter is inserted between the focusing lens and the two-dimensional infrared sensor, the diameter of the shutter aperture in the open state of the shutter is greater than the diameter of the conical light flux connecting the lens aperture and the focal point of the lens. This is so because the two-dimensional infrared sensor has a predetermined area (i.e., light-receiving area) so that it is necessary to cause the infrared rays from the object under measurement to be incident on the sensor area up to the edge thereof.

Therefore, in the open state of the shutter, an unnecessary infrared flux is incident from the difference area, which corresponds to the difference between the shutter aperture in the open state of the shutter and the diameter of the conical light flux noted above at the shutter position (i.e., a doughnut-like area) in addition to the infrared flux from the object under measurement on the two-dimensional infrared sensor. In the closed state of the shutter, the infrared flux from the shutter in the same field of view as when the shutter is open, is incident on the two-dimensional infrared sensor. It will be seen that the optical equivalence in the open and closed shutter states is lacking, giving rise to an error in the temperature measurement.

In an infrared camera, a phenomenon called shading (temperature gradient) arises, which has nothing to do so the object under measurement but stems from stray light in the camera casing. The shading is such that the infrared energy that is incident on a two-dimensional infrared sensor is increased as one goes from the center toward the edge of the sensor when the ambient temperature is high and reduced as one gores from the center toward the edge of the sensor when the ambient temperature is low, and it is particularly pronounced in non-cooled infrared cameras.

When such a temperature gradient is generated in spite of the fact that intrinsically it should not be present, accurate temperature measurement from infrared image cannot be obtained. Accordingly, the infrared sensor temperature is corrected by removing the effect of the shading.

In one method of such shading correction, a planar heat source at a uniform temperature is manually disposed in front of a lens, or a cap is fitted on the lens, and correction is made to make the outputs of individual image elements of the two-dimensional infrared sensor to be uniform.

In another method of shading correction, the correction is made by inserting a mechanically driven plate serving as a uniform temperature planar heat source between the lens and the two-dimensional infrared sensor.

However, the former method has a problem that a long time is required for the correction because of the manual setting of the planar heat source. The latter method has a problem that it is impossible to remove the effect of shading which is attributable to the presence of the lens.

SUMMARY OF THE INVENTION

An object of the present invention is to provide a method of and a system for infrared sensor temperature correction, which permit accurate temperature correction irrespective of ambient temperature characteristics fluctuations with individual systems and sudden and secular ambient temperature changes, require short adjustment time for the temperature correction, permit the temperature correction with only momentary thermal image display interruption, and also provide an infrared thermographic system using a two-dimensional infrared sensor.

Another object of the present invention is to provide an infrared sensor device with a shading correction function, which can make up for the effect of shading attributable to the lens in a short period of time.

According to an aspect of the present invention, there is provided an infrared sensor device with temperature correction function comprising: a two-dimensional infrared sensor for producing a thermal image signal corresponding to an infrared image of an object under measurement which is incident through an optical system; a shutter means disposed at a position adjacent an aperture stop in the optical system and nearer an incident aperture than the aperture stop; and a temperature correction means for correcting the output of the infrared sensor means to obtain the temperature of the object under measurement by producing as a reference output an output from the infrared sensor means when the shutter means is closed state and removing output components of the infrared sensor means from other objects including the optical system than the object under measurement on the basis of an output of the infrared sensor means when the shutter means is opened state, the reference output and the temperature of the shutter means detected by the temperature sensor means.

According to another aspect of the present invention, there is provided a temperature correction method of an infrared sensor device comprising the steps of: producing a thermal image signal corresponding to an infrared image of an object under measurement which is incident to a two-dimensional infrared sensor through an optical system; detecting a temperature a shutter means disposed at a position adjacent an aperture stop in the optical system and nearer an incident aperture than the aperture stop; correcting an output of the infrared sensor means to obtain a temperature of the object under measurement by producing as a reference output an output from the infrared sensor means when the shutter means is closed state; and removing output components of the infrared sensor means from other objects including the optical system than the object under measurement on the basis of an output of the infrared sensor means when the shutter means is opened state, the reference output and the temperature of the shutter means detected by the temperature sensor means.

According to other aspect of the present invention, there is provided, in infrared thermography comprising an infrared sensor, an optical system for projecting an infrared image of an object under measurement on the infrared sensor, a signal processing unit for processing the output of the infrared sensor to generate a thermal image signal of the object under measurement, and a display for displaying the thermal image of the object under measurement, an infrared sensor temperature correction method for correcting the infrared sensor output such that the temperature represented thereby approaches the temperature of the object under measurement, the infrared sensor temperature correction method comprising a step of comparing the output $Q_R$ of the infrared sensor, the output $Q_R$ being obtained when infrared rays emitted from a reference heat source at a known temperature are led to the infrared sensor in lieu of infrared rays emitted from the object under measurement, and the output $Q_W$ of the infrared sensor, the output $Q_W$ being obtained when infrared rays from the object under measurement are led through the optical system to the infrared sensor, thereby removing an output component $Q_E$ of the infrared sensor, the output component $Q_E$ being attributable to infrared rays from the other objects than the object under measurement such as the optical system, to obtain an output a of the infrared sensor, the output a being attributable to sole infrared rays emitted from the object under measurement, wherein: a shutter and a temperature sensor for detecting the temperature of the shutter are provided in the optical system, the shutter serving as the reference heat source when it is in the closed state, the known temperature of the reference heat source being determined from the output of the temperature sensor, the shutter being disposed at a position adjacent an aperture stop in the optical system and nearer an incidence aperture than the aperture stop.

According to still other aspect of the present invention, there is provided an infrared thermographic system comprising a two-dimensional infrared sensor, an optical system for projecting an infrared image of an object under measurement on the two-dimensional infrared sensor, a signal processing unit for processing the output of the two-dimensional sensor to generate a thermal image signal of the object under measurement, and a display for displaying the thermal image of the object under measurement by receiving the thermal image signal, wherein: the optical system includes a shutter for opening and closing its optical path, a temperature sensor for measuring the temperature of the shutter, and an aperture stop for defining the field of view of the two-dimensional infrared sensor when the shutter is held open; the infrared thermographic system further comprising a first and a second image memory, a control unit for controlling the opening and closing of the shutter and causing the outputs $Q_W$ and $Q_E$ of the two-dimensional infrared sensor when the shutter is held open and closed, respectively, in the respective first and second image memories, and a computing unit for computing the difference $Q_D$ between the two-dimensional infrared sensor outputs $Q_W$ and $Q_E$ read out from the first and second image memories and also computing the output a of the two-dimensional image sensor attributable to sole infrared rays emitted from the object under measurement according to the output of the temperature sensor; and the computing unit computes, the two-dimensional infrared sensor receives sole infrared rays emitted from the object under measurement with the shutter held in the closed state, the output [a'] of the two-dimensional infrared sensor according to the output of the temperature sensor, and also computes the output a of the two-dimensional infrared sensor by adding the output [a'] to the difference $Q_D$.

In the present invention, a shutter which can be momentarily held open and immediately closed, is disposed adjacent to an aperture stop in the optical system, and a temperature sensor is provided for measuring the temperature of the shutter. With this construction, the blades of the shutter can be utilized as the reference heat source. In addition, with the shutter disposed adjacent to the aperture stop, the optical equivalence in the case when a reference heat source is inserted and in the other case, is not spoiled. The shutter used may be a lens shutter which is usually used in the photographic industry. According to the present invention, a mechanism for inserting and removing the reference heat source, can be inexpensively realized, has excellent reliability, is stable in operation, can quickly insert and remove the reference heat source, and permits the temperature correction with only momentary thermal image display interruption.

According to further aspect of the present invention, there is provided an infrared sensor device with temperature correction function comprising: a combination lens including a shutter for forming an infrared image; a shutter controller for controlling the opening and closing of the shutter; a two-dimensional infrared sensor for focusing an infrared image thereon through the combination lens; an A/D converter for converting an analog electric signal outputted for each image element by image element scanning of the two-dimensional infrared sensor into a digital signal; a subtracter for subtracting the output signal of the A/D converted inputted to one input terminal and a signal inputted to the other input terminal from each other; a shading memory for storing one frame of the output of the A/D converter in the closed state of the shutter, the stored signal being read out in the subsequent open state of the shutter from the shading memory with image element position coincidence with the signal inputted to one input terminal of the subtracter and inputted to the other input terminal thereof; and a frame memory for storing the output of the subtracter in units of frames.

According to still further aspect of the present invention, there is provided an infrared sensor device with temperature correction function comprising: a shutter means provided at a position adjacent an aperture stop in the optical system; a two-dimensional infrared sensor for producing an infrared image thereon through the optical system; memory means for storing one frame of the output of the two-dimensional infrared sensor in the closed state of the shutter, the stored signal being read out in the subsequent open state of the shutter; and a subtracter for subtracting the read out signal from the memory means from the corresponding output signal of the respective image elements obtained by the two-dimensional infrared sensor, thereby removing a shading of temperature gradient caused by stray light in a casing.

The infrared sensor device is a non-cooled two-dimensional infrared sensor.

In the foregoing invention, using the combination lens including the shutter disposed at the optical pupil position, image element scanning of the two-dimensional infrared sensor, which is affected by shading due to stray light, is made with the shutter held closed to block infrared rays through the lens, and a signal thus obtained is stored for each image element in the shading memory. Then, by opening the shutter, an image of external infrared rays is focused on the two-dimensional infrared sensor, and image element scanned to take out a signal for image element. The shading effect is removed by subtracting, from this taken-out signal, the image element signal having been stored in the shading memory for each image element.

The storing of signal in the shading memory in the closed state of the shutter, i.e., updating of the shading memory, may be made automatically in a predetermined cycle.

Alternatively, it may be made when the change in temperature with lapse of time has exceeded a predetermined value. As a further alternative, it may be made automatically on the basis of operator's observation.

Other objects and features will be clarified from the following description with reference to attached drawings.

BRIEF DESCRIPTION OF THE DRAWINGS

FIG. 2 shows a schematic view showing the embodiment shown in FIG. 1 with the shutter 3 held closed;

PREFERRED EMBODIMENTS OF THE INVENTION

Preferred embodiments of the invention will now be described will now be described with reference to the drawings.

Figure 1:
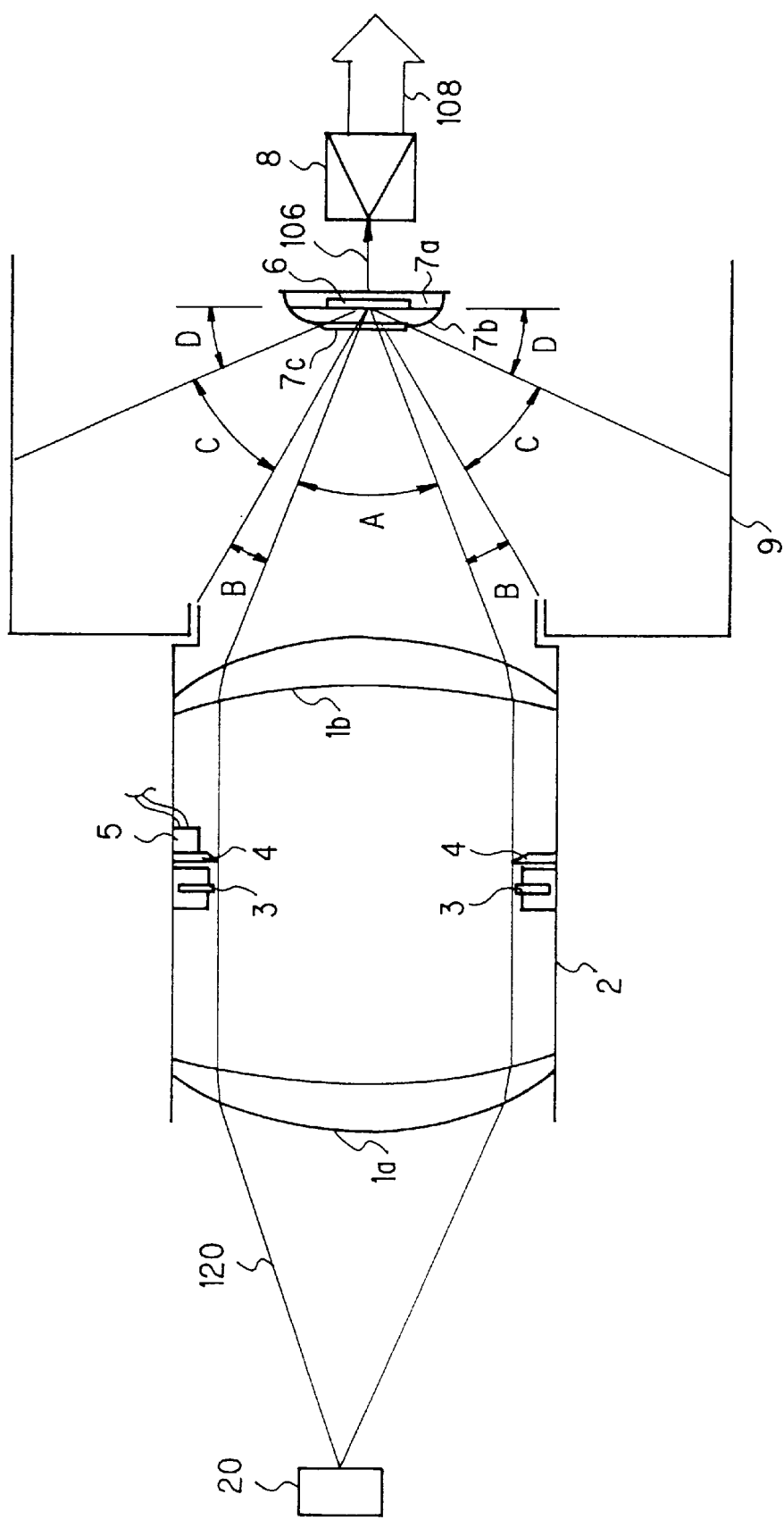
FIG. 1 shows a schematic view representing the construction of an essential part of a camera head for infrared thermography as an embodiment of the present invention.

FIG. 1 is a schematic view showing the construction of an essential part of a camera head for infrared thermography as an embodiment of the present invention. In the illustrated state of the camera head, a shutter is open. Referring to the figure, designated at 1a and 1b are lenses, at 2 a cylinder of an optical system, at 3 a shutter, at 4 an aperture stop, at 5 a temperature sensor, at 6 a two-dimensional infrared sensor, at 7a a support with the infrared sensor 6 mounted thereon (and also serving as a Peltier effect element for cooling the infrared sensor 6), at 7b a metal cover, at 7c a window for passing infrared rays therethrough, at 8 an A/D converter, at 9 a camera head casing, at 20 an object under measurement, at 106 the output of the infrared sensor 6, at 108 the output of the A/D converter 8, at 120 infrared rays emitted from a point on the object 20 under measurement and projected through the optical system on the infrared sensor 6, at A infrared rays passed through the lens aperture (i.e., the aperture of the aperture stop 4) and converged through the optical system to be incident on the infrared sensor 6, at B infrared rays emitted from the aperture stop 4 and lens cylinder 2 to be incident on the infrared sensor 6, at C infrared rays emitted from the camera head casing 9 to be incident on the infrared sensor 6, and at D infrared rays emitted from the infrared sensor casing (i.e., support 7a and cover 7b) to be incident on the infrared sensor 6. The infrared sensor casing which comprises the support 7a, cover 7b and window 7c, holds the infrared sensor 6 in vacuum.

In the consideration of the geometrical classification of the infrared rays incident on the infrared sensor 6, an infrared beam constituted by the components A to D as shown is incident on the infrared sensor 6. The component A is the infrared rays from the inside of the lens aperture. This component alone is necessary for the temperature measurement of the object 20. The component B is infrared rays from the aperture stop 4 itself and the lens cylinder 2. The component C is infrared rays from the camera head casing inner walls. The component D is infrared rays from the casing of the infrared sensor 6.

When the shutter 3 is open as shown in FIG. 1, the infrared beam incident on the infrared sensor 6 is classified to the components A to D. The components of the output of the infrared sensor 6 corresponding to the infrared beam components A to D are denoted by a to d, the sum of the components a to d is denoted by $Q_W$ ($Q_W$=a+b+c+d), and the sum of the beam components a, c and d is denoted by $Q_E$ ($Q_E$=b+c+d).

The beam components b to d vary greatly in dependence on the influence of the ambient temperature, way of changes in the ambient temperature, air convection and of the heat source such as sunlight, and it is difficult to accurately eliminate such influence by the estimation method or the table method. Where a heat source is provided right before the infrared sensor 6, it is impossible to have reference to the sole heat source without influence on the beam components other than the component A.

FIG. 2 is a schematic view showing the embodiment shown in FIG. 1 with the shutter 3 held closed. When the shutter 3 is closed as shown in FIG. 2, an infrared beam component A' emitted from the shutter 3, is incident on the infrared sensor 6 in lieu of the infrared beam component A passed through the lens aperture as shown in FIG. 1 among the beam components incident on the infrared sensor 6. Since the shutter 3 is momentarily held closed and opened, the components B to D are not changed. Denoting the component of the output of the infrared sensor 6 corresponding to the infrared beam component A by a', with the shutter 3 in the closed state as shown in FIG. 2 the output of the infrared sensor 6 is (a'+b+c+d). This output a'+b+c+d is denoted by $Q_R$ ($Q_R$=a'+b+c+d).

It is possible, through computation of the difference $Q_D$ between the outputs $Q_W$ and $Q_R$ of the infrared sensor 6 in the two, i.e., open and closed, states of the shutter 3, to readily extract the sole component a–a' regardless of the presence of any unnecessary incident infrared rays. That is, the component a–a' is obtainable from an equation:

$$Q_D Q_W - Q_R = (a+b+c+d) - (a'+b+c+d) = a - a' \quad (1)$$

The temperature of the shutter 3 which corresponds to the infrared beam component A', can be measured with the temperature sensor 5. This means that the infrared energy that is incident as the beam component A' on the infrared sensor 6, can be theoretically computed. The infrared energy emitted from the shutter 3 is theoretically computed for each wavelength using the Planck's equation of emission. The output of the infrared sensor 3 corresponding to the infrared energy incident thereon, can be computed through multiplication of the infrared energy for each wavelength by the spectral sensitivity of the infrared sensor 3. Thus, by considering the shutter 3 as the reference heat source and detecting the temperature of the shutter 3 with the temperature sensor 5, it is possible to compute the output of the infrared sensor 6 corresponding to the infrared beam component A' emitted from the shutter 3. The output of the infrared sensor 6 corresponding to the infrared beam component A' emitted from the shutter 3, which is computed on the basis of the output 105 of the temperature sensor 5, is denoted by [a']. Theoretically, [a']=a'. Actually, however, it is possible to use [a']=a', although doing so gives rise to a slight error.

Thus, the output a of the infrared sensor 6 corresponding to the infrared beam component A from the object 20 under measurement, is obtainable by measuring the output $Q_W$ of the infrared sensor 6 with the shutter 3 in the open state (FIG. 1) and the output $Q_R$ of the infrared sensor 6 with the shutter 3 in the closed state (FIG. 2), computing the difference $Q_D$=a–a' between $Q_W$ and $Q_E$ using the equation (1), and adding [a'], obtained by the theoretical computation on the basis of the output of the temperature sensor 5, to the difference $Q_D$=a−a' as:

$$(a-a')+[a']=a \quad (2)$$

Figure 3:
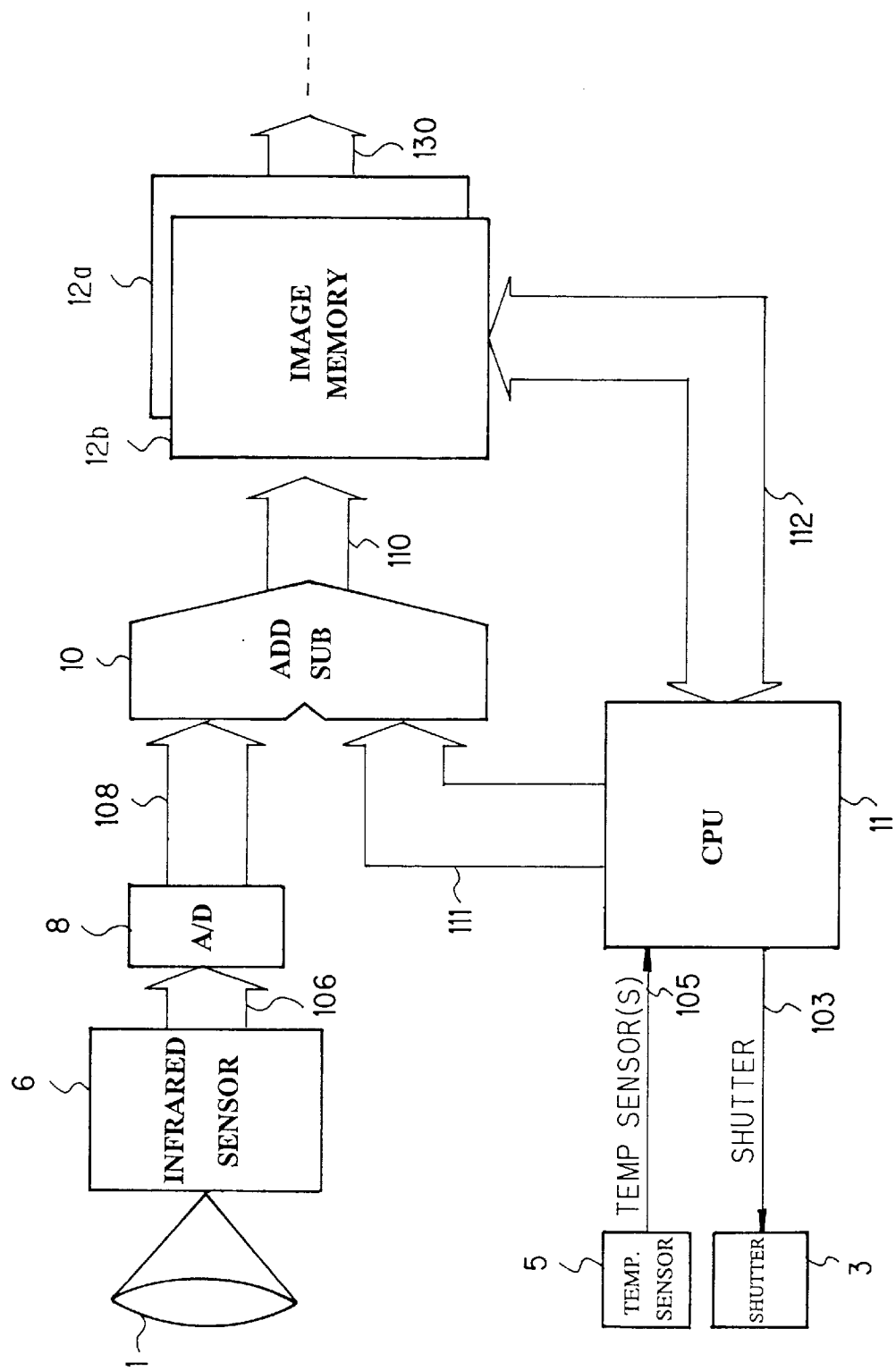
FIG. 3 shows an infrared thermography circuit for measuring the infrared energy emitted from the object under measurement.

FIG. 3 shows an infrared thermography circuit for measuring the infrared energy emitted from the object 20 under measurement (corresponding to the temperature of the object 20). Referring to the Figure, designated at 1 is a lens which collectively represents the lenses 1a and 1b, at 10 an adder/subtracter, at 11 a CPU (central processing unit), at 12a and 12b a first and a second image memory, at 103 a signal for on-off controlling the shutter 3, at 105 the output of the temperature sensor 5 and representing the temperature of the shutter 3, and at 130 the output of the image memory 12a.

The CPU 11 includes the control unit and the computing unit as described before. The control unit of the CPU 11 on-off controls the shutter 3 according to the signal 103 to let the outputs $Q_W$ and $Q_R$ of the infrared sensor 6 with the shutter 3 in the open and closed states, respectively, in the respective image memories 12a and 12b. The computing unit of the CPU 11 then computes the difference $Q_D$ given by the equation (1). The computing unit then computes the output [a'] of the infrared sensor 6 corresponding to the infrared beam component A' emitted from the shutter 3 with the shutter 3 in the closed state according to the temperature of the shutter 3 represented by the output 105 of the temperature sensor, and determines the output a of the infrared sensor 6 corresponding to the sole infrared beam component A from the object 20 under measurement by performing the addition in the equation (2), i.e., addition of [a'] to (a−a') having been obtained using the equation (1). In this way, the infrared energy of the object 20, i.e., the temperature thereof, can be measured. The temperature of the object 20 that is measured in this way, is free from the influence of the infrared beam components B to D emitted from the optical system and other objects other than the object 20 under measurement.

As an alternative, the computing unit of the CPU 11 may compute the difference $Q_R$−[a'] between the output $Q_R$ of the infrared sensor 6 with the shutter 3 in the closed state ($Q_R$=a'+b+c+d stored in the image memory 12b) and the output [a'] of the infrared sensor 6 corresponding to the infrared beam component A' from the shutter 3 as computed from the output 105 of the temperature sensor 5. This difference is denoted by $Q_E$ ($Q_E$=(a'+b+c+d)−[a']). $Q_E$ represents the unnecessary infrared energy (b+c+d). After $Q_E$ has been obtained, the adder/subtracter 10 generates the difference $Q_W$−$Q_E$ between the output $Q_W$ of the infrared sensor 6 with the shutter 3 in the open state and the infrared sensor output component $Q_E$ corresponding to the unnecessary infrared rays. This difference $Q_W$−$Q_E$ constitutes the infrared sensor output a representing the infrared beam component A from the object 20 under measurement 20.

In a first method of measuring the infrared energy a from the object 20 under measurement in the circuit shown in FIG. 3, as described above, $Q_W$ and $Q_E$ are stored in the image memories 12a and 12b under control of the control unit of the CPU 11. Then, by reading out $Q_W$ and $Q_E$ through control unit of the CPU 11, the computing unit of the CPU 11 computes the infrared energy [a'] emitted from the shutter 3 according to the output of the temperature sensor 5, and obtains $Q_D$=$Q_W$−$Q_R$=a−a' and (a−a')+[a']=a after the equations (1) and (2).

In a second method of computing the infrared energy a from the object 20 in the circuit shown in FIG. 3, $Q_R$=a'+b+c+d is stored in the image memory 12 under control of the control unit of the CPU 11. Then, by reading out $Q_R$ from the image memory 12b under control of the control unit, the CPU 11 computes the infrared energy [a'] emitted from the shutter 3 according to the output of the temperature sensor 5, obtains $Q_R$−[a']=b+c+d=$Q_E$, and supplies $Q_E$ to the adder/subtracter 10. The adder/subtracter 10 generates the difference a between the outputs $Q_W$ and $Q_E$ of the infrared sensor 6 (i.e., outputs of the A/D converter 8) with the shutter 3 in the open and closed states, respectively. The infrared energy a emitted from the object 20 under measurement is temporarily stored in the image memory 12a, and is then read out and outputted as the signal 130. In this second method, the CPU 11 computes $Q_E$=$Q_R$−[a'], and the adder/subtracter 10 computes $Q_W$−$Q_E$. In the long run, in the entirety of the circuit shown in FIG. 3, $Q_W$−($Q_R$−[a'])=($Q_W$−$Q_R$)+[a']=a−a'+[a'] is outputted from the adder/subtracter 130 and stored in the image memory 12a to be outputted as the signal 130 therefrom. As is seen, the same computation as in the first method is made. For the measurement of the infrared energy a from the object 20 under measurement, either of the first or the second method is adopted in dependence on the procedure of the processing in the CPU 11.

In the above description, the infrared energy emitted from the shutter 3 with the shutter 3 in the closed state is theoretically calculated. Alternatively, the computing unit of the CPU 11 may compute [a'] by an interpolation method, in which a table stored in storage means and showing the correspondence relation between the temperature of the shutter 3 and the output $Q_R$ of the two-dimensional infrared sensor 6 is referred to at each temperature of the shutter 3 which is determined from the output of the temperature sensor 5. The table is produced by determining, at a plurality of dispersed temperatures of the shutter 3, the output $Q_R$ of the infrared sensor 6 receiving the infrared rays from the shutter 3 in the closed state thereof.

As has been described in detail in conjunction with the above embodiment, with the method of and system for infrared sensor temperature correction and also infrared thermographic system using a two-dimensional infrared sensor according to the present invention, it is not necessary to estimate the unnecessary infrared radiation by disposing a temperature sensor in the system or correct the infrared sensor temperature from actually measured infrared radiation data. In addition, it is possible to always remove the influence of any temperature distribution in the system, thus permitting accurate measurement of infrared energy emitted from the object under measurement. Thus, with the method and apparatus according to the present invention accurate temperature correction is obtainable irrespective of ambient temperature characteristics fluctuations of individual systems. The temperature correction requires short adjustment time, and is obtainable with only momentary thermal image display interruption. The equivalence of the optical system can be maintained when the reference heat source is inserted.

Since the thermal image display is interrupted only momentarily, it is possible to use a lens shutter usually used in the photographic industry for the system according to the present invention, thus reducing the price of the system and improve the reliability thereof. According to the present invention, with the shutter disposed adjacent to the lens aperture stop, it is possible to refer to the reference heat source while maintaining the optical equivalence. Thus, it is possible to eliminate reference errors, which pose a problem in a heat source reference system without optical equivalence.

With the above effects of the present invention, it is possible to greatly reduce temperature measurement error which is peculiar to the two-dimensional infrared sensor with a simple construction and greatly save factory adjustment time and expenditures.

Comparing to the correction method disclosed in Japanese Laid-Open Patent Publication No. 63-163126, according to the invention, the shutter is disposed at the aperture stop position, which determines the effective lens aperture diameter. At the position of the aperture stop, the field of view is the same when the shutter is open and closed.

It is thus possible to refer to the reference heat source (i.e., shutter) while the optical equivalence is maintained, thus eliminating the measurement error which is the problem in the above case of lacking optical equivalence.

Figure 4:
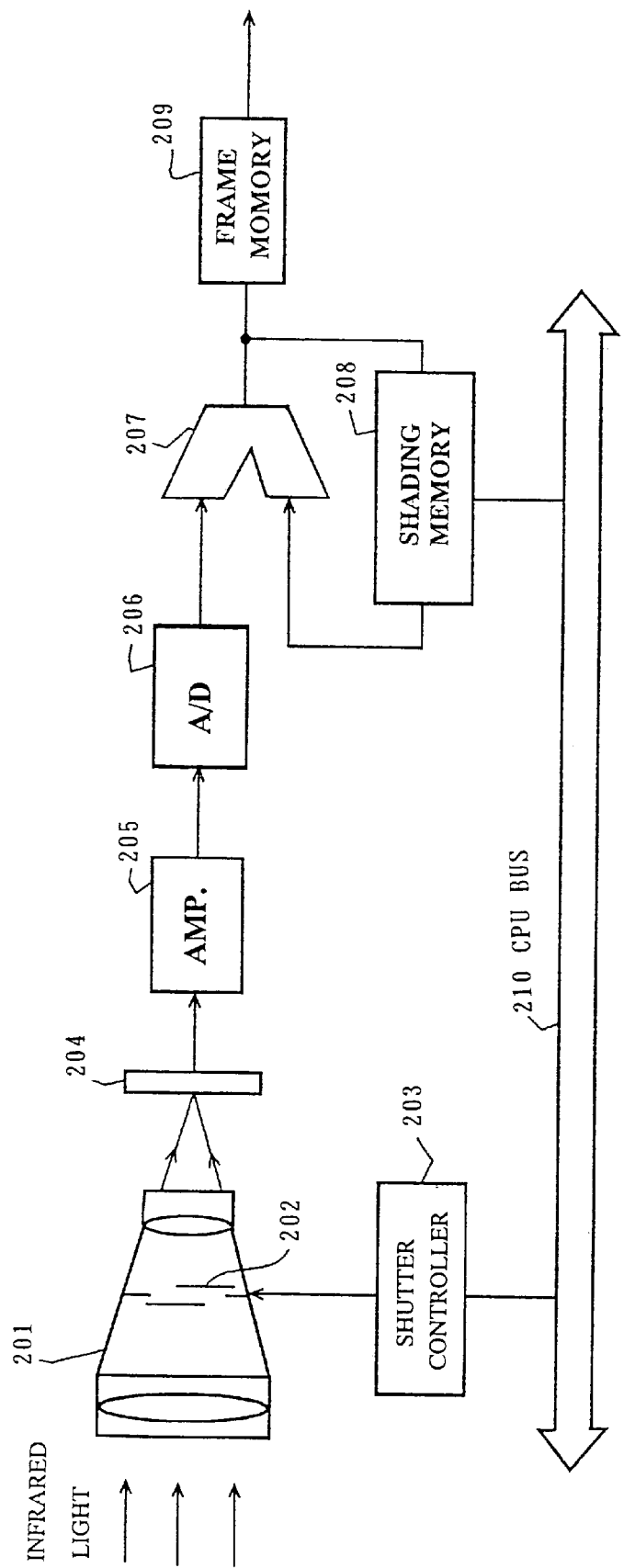
FIG. 4 shows a block diagram representing other embodiment of the infrared camera according to the present invention.

FIG. 4 is a block diagram showing other embodiment of the infrared camera according to the invention. At the optical pupil position of a combination lens 201, i.e., position adjacent an aperture stop in an optical system, for converging externally incident infrared rays, a shutter 202 is provided, which is opened and closed by a shutter controller 203. When the shutter 202 is held open, the converged infrared beam is focused on the incidence surface of a two-dimensional infrared sensor 204. The two-dimensional infrared sensor 204 is scanned by fixed scanning (such as luster scan) to take out an electric signal for each image element in correspondence to the infrared intensity.

The infrared image signal which is thus taken out, is amplified in an amplifier 205 up to a level necessary for subsequent processing. The amplified signal is converted in an A/D converter 206 into a digital signal, which consists of a number of bits that satisfies a required gradation (tone) degree. The digital signal thus obtained is inputted to one input terminal of a subtracter 207 for removing shading effects on it. After the shading removal, the signal is outputted to a frame memory 209.

A shading memory 208 is connected to the subtracter 207 such as to be able to store the output thereof. The stored signal can be read out and inputted to the other input terminal of the subtracter 207.

Specifically, when the shutter 202 is closed, the output of the A/D converter 206 is stored for one frame in the shading memory 208 through the subtracter 207. At this time, no data is read out from the shading memory 208, and no signal is inputted to the other input terminal of the subtracter 207. Thus, the subtracter 207 does no subtraction, and outputs the input from the A/D converter 206 for each image element directly to the shading memory 208.

The data thus stored represents a shading thermal image, which is attributable to stray light in the lens and casing after the shutter 202.

When the shutter 202 is opened, the thermal image formed on the two-dimensional infrared sensor 204 as a result of converging externally incident infrared rays, is the sum of a component attributable to the externally incident infrared rays and a component attributable to the shading.

Thus, the thermal image which is attributable to the sole external infrared rays, can be obtained by subtracting the shading component from the thermal image formed on the two-dimensional infrared sensor.

This means that by reading out data having been stored in the shading memory 208 in the open state of the shutter 202 and inputting the read-out data to the other input terminal of the subtracter 207 to subtract the data from the signal inputted from the A/D converter 206 for each image element, thermal image data can be obtained, which is free from shading effect and attributable to the sole external infrared rays.

The data thus obtained is stored in the frame memory 206 for subsequent processing.

A CPU is utilized for the interlock of the operation of the shutter controller 203 and the operation of storing and reading data in and from the shading memory 208 to each other.

As has been described in the foregoing, in the two-dimensional sensor camera with a shading correction function according to the invention, a shutter, which can be readily momentarily held open and immediately closed under control of an external controller, is disposed at the optical pupil position of a combination lens for converging Infrared rays, and thermal image data in the closed state of the shutter, is stored in a shading memory and subtracted for each image element from thermal image data which is obtained by picking up external infrared image by opening the shutter. Thus, the camera operator need not manually set a uniform temperature planar heat source or fit a cap on lens, and it is possible to automatically obtain shading correction of removing shading effect attributable to the lens disposed after the shutter in a short period of time.

In the foregoing description and accompanying drawings is offered by way of illustration only. It is therefore intended that the foregoing description be regarded as illustrative rather than limiting.

What is claimed is:

1. An infrared sensor device with temperature correction function comprising:

a two-dimensional infrared sensor for producing a thermal image signal corresponding to an infrared image of an object under measurement which is incident therein through an optical system;

a shutter disposed at a position in the optical system adjacent to or at an aperture stop in the optical system;

a temperature correction means for correcting an output of the infrared sensor to obtain a temperature of the object under measurement by producing as a reference output an output from the infrared sensor when the shutter is in a closed state and removing output components of the infrared sensor from objects, including the optical system, other than the object under measurement on the basis of an output of the infrared sensor when the shutter is in an opened state; and a temperature sensor for detecting the temperature of the shutter.

2. The infrared sensor device with temperature correction function as set forth in claim 1, wherein the reference output is obtained by interpolation of data which is previously obtained at a plurality of dispersed temperatures of the shutter.

3. A temperature correction method of an infrared sensor device comprising the steps of:

producing a thermal image signal corresponding to an infrared image of an object under measurement which is incident on a two-dimensional infrared sensor through an optical system;

detecting a temperature of a shutter disposed at a position adjacent to or at an aperture stop in the optical system;

correcting an output of the infrared sensor to obtain a temperature of the object under measurement by producing as a reference output an output from the infrared sensor when the shutter is in a closed state; and removing output components of the infrared sensor from objects, including the optical system, other than the object under measurement on the basis of an output of the infrared sensor when the shutter is in an opened state.

4. In a method of infrared thermography using an infrared sensor, an optical system for projecting an infrared image of an object under measurement on the infrared sensor, the optical system including a shutter and an aperture stop, the shutter being disposed adjacent to or at the aperture stop, a temperature sensor for detecting the temperature of the shutter, a signal processing unit for processing the output of the infrared sensor to generate a thermal image signal of the object under measurement, and a display for displaying the thermal image of the object under measurement, an infrared sensor temperature correction method for correcting the infrared sensor output such that the temperature represented thereby approaches the temperature of the object under measurement, the infrared sensor temperature correction method comprising:

comparing the output $Q_R$ of the infrared sensor, the output $Q_R$ being obtained when infrared rays emitted from a reference heat source at a known temperature are led to the infrared sensor in lieu of infrared rays emitted from the object under measurement, and the output $Q_W$ being of the infrared sensor, the output $Q_W$ being obtained when infrared rays from the object under measurement are led through the optical system to the infrared sensor, thereby removing an output component $Q_E$ of the infrared sensor, the output component $Q_E$ being attributable to infrared rays from objects other than the object under measurement, to obtain an output a of the infrared sensor, the output a being attributable to sole infrared rays emitted from the object under measurement, wherein:

the shutter serves as the reference heat source when it is in the closed state and the known temperature of the reference heat source is determined from the output of the temperature sensor.

5. An infrared thermographic system comprising a two-dimensional infrared sensor, an optical system for projecting an infrared image of an object under measurement on the two-dimensional infrared sensor, a signal processing unit for processing the output of the two-dimensional sensor to generate a thermal image signal of the object under measurement, and a display for displaying the thermal image of the object under measurement by receiving the thermal image signal, wherein:

the optical system includes a shutter for opening and closing its optical path, a temperature sensor for measuring the temperature of the shutter, and an aperture stop;

the infrared thermographic system further comprising a first and a second image memory, a control unit for controlling the opening and closing of the shutter and causing outputs QW and QE from the two-dimensional infrared sensor when the shutter is held open and closed, respectively, to be stored in the respective first and second image memories, and a computing unit for computing the difference $Q_D$ between the two-dimensional infrared sensor outputs $Q_W$ and $Q_E$ read out from the first and second image memories and also computing the output a of the two-dimensional image sensor attributable to sole infrared rays emitted from the object under measurement, the computing unit computing an output a' of the two-dimensional infrared sensor according to the output of the temperature sensor, and by adding the output a' to the difference $Q_D$.

6. The infrared thermographic system according to claim 5, which further comprises storage means for storing a table showing the correspondence relation between the shutter temperature and the output $Q_R$ of the two-dimensional infrared sensor when the two-dimensional infrared sensor receives infrared rays emitted from the shutter in the closed state thereof, the output $Q_R$ being obtained at a plurality of dispersed temperatures of the shutter and in which:

the computing unit computes the output a' by an interpolation method, in which the table is referred to at each shutter temperature determined on the basis of the output of the temperature sensor.

7. An infrared sensor device with temperature correction function comprising:

a combination lens including a shutter for forming an infrared image;

a shutter controller for controlling the opening and closing of the shutter;

a two-dimensional infrared sensor for focusing an infrared image thereon through the combination lens;

an A/D converter for converting an analog electric signal outputted for each image element by image element scanning of the two-dimensional infrared sensor into a digital signal;

a subtracter for subtracting the output signal of the A/D converted inputted to one input terminal and a signal inputted to the other input terminal from each other;

a shading memory for storing one frame of the output of the A/D converter in the closed state of the shutter, the stored signal being read out in the subsequent open state of the shutter from the shading memory with image element position coincidence with the signal inputted to one input terminal of the subtracter and inputted to the other input terminal thereof; and a frame memory for storing the output of the subtracter in units of frames.

8. An infrared sensor device with temperature correction function comprising:

an optical system;

a shutter means provided at a position adjacent an aperture stop in the optical system;

a two-dimensional infrared sensor for producing an infrared image thereon through the optical system;

memory means for storing one frame of the output of the two-dimensional infrared sensor in the closed state of the shutter, the stored signal being read out in the subsequent open state of the shutter; and a subtracter for subtracting the read out signal form the memory means from the corresponding output signal of the respective image elements obtained by the two-dimensional infrared sensor, thereby removing a shading of temperature gradient caused by stray light in a casing.

9. An infrared sensor device with temperature correction function as set forth in claim 8, wherein the infrared sensor device is a non-cooled two-dimensional infrared sensor.

* * * * *